Oct. 18, 1932.  J. B. O'DONNELL  1,882,868
WAGON HITCH
Filed Aug. 14, 1930
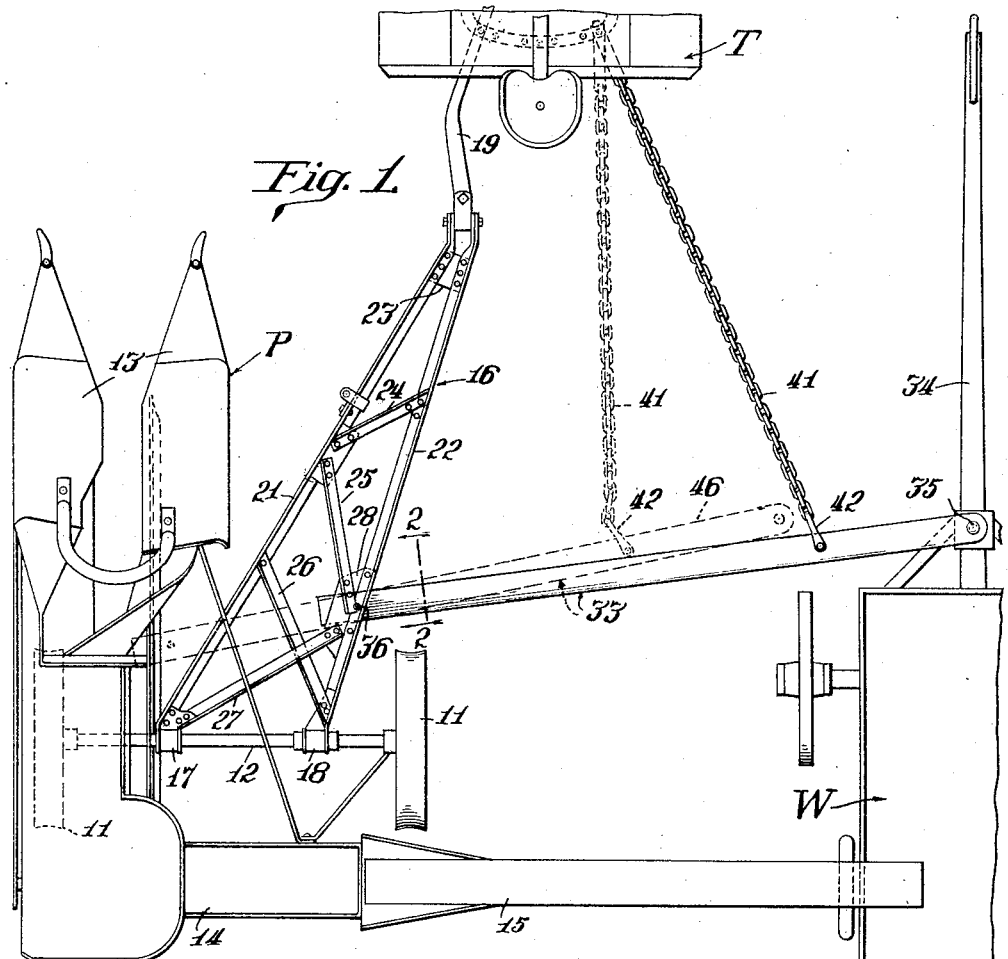
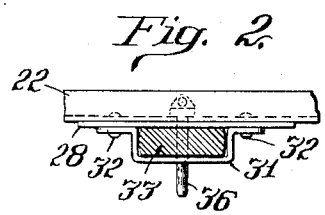
Inventor.
John B. O'Donnell
Witness
Milton Lenoir
By Brown, Jackson, Boettcher & Dienner
Attorneys Patented Oct. 18, 1932

1,882,868

UNITED STATES PATENT OFFICE

JOHN B. O'DONNELL, OF SHELDON, IOWA, ASSIGNOR TO DEERE & COMPANY, OF MOLINE, ILLINOIS, A CORPORATION OF ILLINOIS

WAGON HITCH

Application filed August 14, 1930. Serial No. 475,181.

This invention relates to draft connections to be used when two or more implements are drawn by a tractor or other motive power, and is more commonly used when it is desired to draw a working implement and a receiving wagon behind a tractor.

The common practice in draft connections of this type is to provide a truck assembly or the like on to which the working implement is secured. This truck assembly usually has a three fold purpose, first, to transmit draft from the tractor or motive power to the operating implement, second, to support and space the loading wagon with respect to the working implement, and third, to transmit draft from the tractor to the wagon. A supplementary structure is then usually necessary to space the wagon a determined distance from the operating implement while transmitting draft thereto. In the normal operation of this type of draft connection, the truck assembly must necessarily be of strong construction to withstand the strains and draft placed upon the same by the wagon and implement. The truck assembly requires a heavy frame structure usually of metal supported on wheels or casters, with a supplementary frame structure for propelling the loading wagon. This structure is obviously expensive to manufacture and is costly to ship due to the weight and bulky nature.

My improved wagon hitch does not entail such a heavy or complicated structure, and may be easily and cheaply manufactured and shipped.

Furthermore, in the draft hitches heretofore used in this connection, it has been necessary in hitching draft animals to the wagon on its being filled to disconnect the whole draft hitch or to move the wagon tongue to one side to provide sufficient room to accommodate the draft animal. In my new and improved construction, a draft animal may be easily interposed between the draft hitch and the wagon by merely moving the draft connection away from the wagon, without the adjustment or changing of numerous elements.

Another object of my invention is to provide a draft hitch which can be quickly and easily assembled or disassembled, and one that does not require numerous adjustments.

In the drawing:

Figure 1 is a plan view of my improved draft connection used in conjunction with a corn picker and wagon drawn by a tractor; and Figure 2 is a transverse view taken on the line 2—2 of Figure 1 showing details of the hitch adjustment on the implement.

Figure 1 discloses a portion of a tractor T adapted to draw an implement, in this case a corn harvester or picker P with a wagon W disposed to one side thereof for receiving corn from the picker. Of course, it is to be understood that this combination may include any type of draft means and not a tractor, or the trailing vehicles may be composed of any type of working vehicle or vehicles wherein a draft hitch of this character is desired.

The corn picker has the usual supporting wheels 11 mounted on either end of the axle 12. This axle 12 supports a frame which carries the gatherers 13 and the picking mechanism which is not disclosed. The husker 14 and elevator 15 transport the corn into the loading wagon W adjacent the picker.

A draft structure 16 projects forwardly and to the right of the picking implement as noted in Figure 1; and a draw link 19 connects this draft structure to the tractor. This draft structure 16 comprises two main angle frame members 21—22 which are joined at their forward end by plate 23, and are individually pivoted at their rearward ends 17—18 to the axle 12. These angle rails 21—22 are braced by a series of cross trussses 24, 25, 26, and 27. A gusset plate 28 is secured beneath the side rail 22 at a point where the trusses 25 and 27 converge; and these trusses are riveted or otherwise secured to the gusset plate 28.

As best shown in Figure 2, a U-shaped bracket or yoke 31 is also disposed beneath the gusset plate 28 and rail 22; and rivets or bolts 32 secure both of these members to the side rail 22. It is to be here noted that my preferred structure discloses the gusset plate and U-shaped bracket on the under side of the angle rail 22, but, obviously, this can be varied within the teachings of my invention; such modification might disclose the bracket structure on the top of angle rail or mounted on the side of the latter.

The U-shaped bracket 31 is adapted to receive one end of a beam 33 therein while the other end of said beam is fastened to the tongue 34 of the wagon as by bolt 35. A pin 36 passing through alined openings in the U-shaped bracket 31, gusset plate 28, side rail 22 and beam 33 prevents lateral displacement of the beam relative to the bracket.

A draft link 41, which may be in the form of a chain, is secured near the outer end of the beam 33 to the clevis 42. Draft is transmitted through the chain 41 from the tractor to the transverse beam 33 and to the wagon. Therefore it will be seen that the beam 33 spaces the wagon a predetermined distance from the implement and tractor while governing the movement thereof and at the same time transmitting draft to the wagon.

By withdrawing the pin 36 which holds the beam 33 in position on the draft member 16, the beam may be slid endwise through the U-shaped bracket until it assumes its innermost position as indicated in dotted lines at 46 in Figure 1. The inner end of the beam then abuts the under side of the angle rail 21 to support the beam clear of the ground and out of the way of the forward line of draft of the wagon.

In the operation of this combination of a tractor drawing a corn picker and loading wagon, the loading wagon will always be adjacent to the corn picker and in proper relation thereto in turning at the end of the rows or on hilly ground as well as on the straightaway. This combination with my improved draft hitch proves very efficient over other draft hitches in that the corn picker or working implement is not obliged to transmit draft to the loading wagon, thus eliminating great stress and strain ordinarily placed upon the working implement, while at the same time the implement directs the forward movement of the wagon.

When the wagon becomes filled and it is desired to hitch a team of horses to the tongue 34, the pins 35 and 36 are removed from the beam and the latter is slid endwise in the U-shaped bracket until it assumes its innermost position. Thus with the beam out of the way in its retracted position there will be adequate room for hitching the draft animals to the tongue of the wagon, and the wagon can then proceed forwardly without interference from the otherwise normally extended beam.

While I have illustrated a preferred embodiment of my invention, I have done so by way of example only as there are many modifications and adaptations which can be made by one skilled in the art without departing from the teachings of the invention.

What I claim is:

1. In a draft connection between a tractor and an agricultural implement and a wagon disposed to one side thereof, draft structure disposed between said implement and wagon and attached to the tractor, said draft structure being capable of endwise movement away from said wagon while being connected to the tractor and supported entirely on the implement.

2. In a draft connection between a tractor and an agricultural implement and a wagon disposed to one side thereof, bracket means on said implement to receive a draft structure which is removably connected to the wagon, said draft structure being movable endwise in said bracket means away from said wagon to accommodate a draft animal.

3. In a draft connection between a tractor and an agricultural implement and a wagon disposed to one side thereof, draft structure disposed between said implement and wagon, a bracket on said implement for the reception of said draft structure, said draft structure being movable through said bracket and away from said wagon and a link connecting the draft structure to the tractor.

4. The combination with a tractor adapted to draw an agricultural implement and a wagon adjacent thereto, of a draft structure disposed between said implement and wagon, said draft structure including a beam for spacing the wagon at a distance from the implement, a draft link between said structure and the tractor for transmitting draft to the wagon, and a bracket structure on said implement for the reception of said beam, whereby said beam may slide through said bracket and transversely of the implement.

5. The combination with a tractor adapted to draw an agricultural implement and a wagon adjacent thereto, of a draft structure disposed between said implement and wagon, said draft structure including a beam for spacing the wagon at a distance from the implement, a draft link between said structure and the tractor for transmitting draft to the wagon, and a bracket structure on said implement for the reception of said beam, said beam adapted to move endwise in said bracket structure out of line of the wagon whereby when the wagon is filled it may be drawn forwardly out of relation with the implement and another wagon moved to occupy its position.

6. In a draft means for securing a wagon adjacent to a working implement adapted to be drawn by a tractor, a beam disposed between said working implement and wagon, a draft link connecting said beam to the tractor, a bracket structure on the implement for the reception of said beam, said beam being movable relative thereto into either one of two positions, the beam in one position extending from the bracket structure and secured to the wagon for transmitting normal draft to the latter and in its second position being slid endwise through the bracket structure to a position out of line of the forward draft of the wagon whereby said wagon may be moved forwardly out of proximity with the implement and another wagon substituted therefor.

7. In a draft connection between a tractor and an agricultural implement and a wagon disposed to one side of the implement, draft means on said implement and connected with said wagon, said draft means being movable substantially transversely of the implement when detached from the wagon, and means movably connecting said implement and draft means whereby the latter is supported entirely by said implement when in detached position.

8. A draft connection between a tractor and an agricultural implement and a wagon disposed to one side thereof, comprising a draft bar on the implement and adapted to be connected with the tongue of said wagon, and a draft connection between said draft bar and the tractor, said draft bar being movable substantially transversely of the implement and supported thereby when detached from said wagon, said draft connection being connected with said draft bar in both positions.

9. A draft connection between a tractor and an agricultural implement and a wagon disposed to one side thereof, said draft connection comprising draft means connected directly with said implement and extending forwardly and connected with the tractor, a bracket on the under side of said draft means, a draft bar positioned in said bracket and connected thereby with said draft means, said draft bar extending laterally and being adapted to be connected to the tongue of the wagon, and a draft link connected directly with the tractor and with said draft bar, said draft bar being slidable inwardly through said bracket when detached from said wagon without detaching said draft link.

10. A draft connection between a tractor and an agricultural implement and a wagon disposed to one side thereof, said draft connection comprising draft means connected with said implement and with the tractor and comprising a pair of rearwardly spaced forwardly converging draft members, a yoke secured to the draft member adjacent said wagon, a draft bar received within said yoke and extending laterally and being adapted to be connected to said wagon in draft transmitting relation, and a draft link connecting the outer end of said draft bar with the tractor, said draft bar being slidable in said yoke away from the wagon when detached therefrom and toward said implement whereby the draft bar is supported by said draft members.

11. A draft connection between a tractor and an agricultural implement and a wagon disposed to one side thereof, said draft connection comprising a draft bar removably connected at one end with said implement and removably connected with the wagon at its other end, and a draft link permanently connected with the tractor and with said draft bar adjacent its connection with the wagon whereby draft is transmitted from the tractor to the wagon, said draft bar and draft link being movable away from said wagon when the draft bar is disconnected therefrom with said draft link still connected with the draft bar.

In witness whereof, I hereunto subscribe my name this 6th day of August, 1930.

JOHN B. O'DONNELL.